J. J. WELLS.
ANIMAL-TRAP.
No. 176,453.                    Patented April 25, 1876.
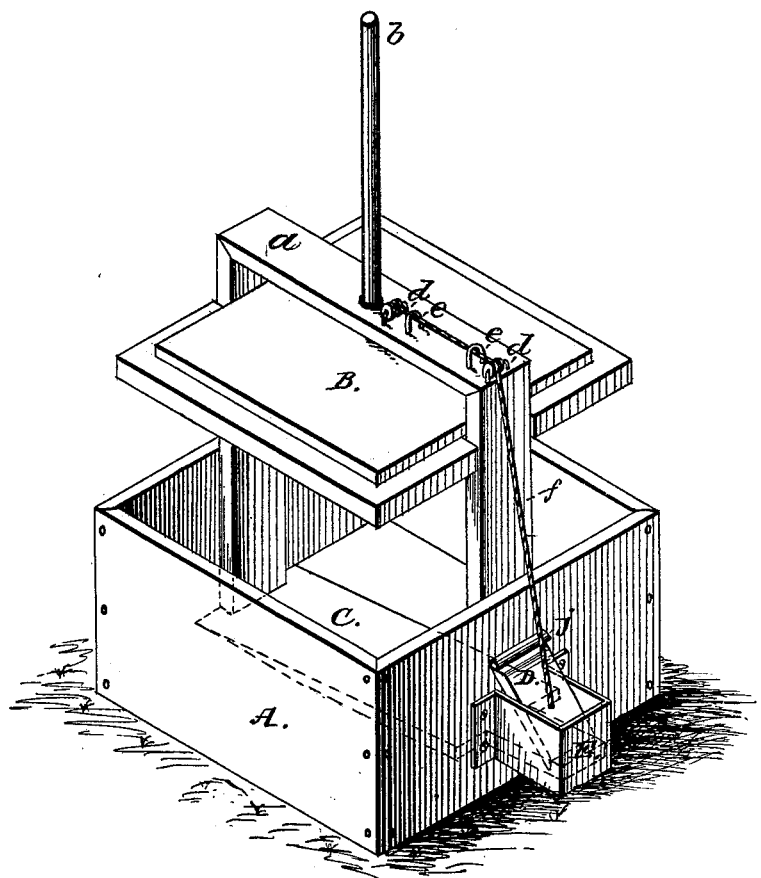
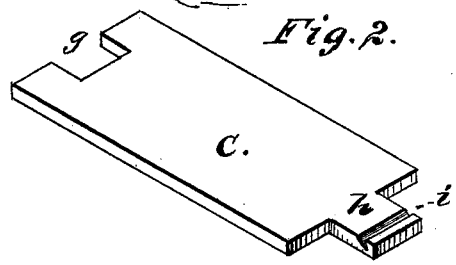
Witnesses:                              Inventor:
John S Bass                             James J Wells
William H Bark

UNITED STATES PATENT OFFICE.

JAMES J. WELLS, OF SOMONAUK, ILLINOIS.

IMPROVEMENT IN ANIMAL-TRAPS.

Specification forming part of Letters Patent No. 176,453, dated April 25, 1876; application filed June 10, 1875.

*To all whom it may concern:*

Be it known that I, JAMES J. WELLS, of Somonauk, county of De Kalb, and State of Illinois, have invented certain new and useful Improvements in Animal-Traps; and I do hereby declare that the following is a full, clear, and exact description of the same, reference being had to the accompanying drawings, forming a part of this specification, in which—

Figure 1 represents a perspective view of my invention, and Fig. 2 a detached view on an enlarged scale of the pedal.

This invention has relation to traps used for catching, concealing, and killing small animals; and consists in the combination and arrangement of the several parts hereinafter described, and subsequently pointed out in the claim.

In the accompanying drawings, A represents a box of any suitable form, having secured thereto a skeleton frame, $a$. A weight, B, corresponds in form to the interior of the box, and has a guide-rod, $b$, working within an opening in the skeleton frame $a$. Secured to the cross-piece of the frame $a$ are grooved pulleys $d$ $d$ and staples $e$ $e$, for guiding the cord $f$ as it passes over the pulleys. One end of the cord $f$ is attached to the lower end of the guide-rod $b$; the other end is secured to a trigger, D. The box A, as will be seen, is formed with an opening its entire length, for the reception of a pedal, C, so as to have the pedal come as near flush as possible with the bottom of the box, and at the same time admit of its operating in springing the trap. The pedal C is cut away, as shown at $g$, to fit around the upright pieces composing the skeleton frame $a$, and has a projecting piece, $h$, with a notch, $i$. This projecting piece $h$ passes out through an opening in the side of the box A. A guard, E, is secured to the side of the box around the opening, for the purpose of protecting the end $h$ and lower end of the trigger D, and preventing the trap from becoming accidentally sprung. A catch, $j$, secured to the side of the box, over the opening, receives the upper end of the trigger D when the trap is set. To set the trap, as shown in Fig. 1, the weight B is first raised and suspended in position by means of the cord $f$, and by placing the upper end of the trigger D under the catch $j$, and engaging its lower end with the notch $i$ in the projecting piece $h$ of the pedal C. After the trap is thus set, the animal enters the box A over its side, and, stepping upon the pedal C, presses it down, which disengages the trigger and allows the weight to fall, crushing the animal and concealing it from others of its species.

I do not claim, broadly, a trap consisting of a falling weight to crush the animal, operated by means of a pedal, a trigger, and a cord; but What I do claim, and desire to secure by Letters Patent, is—

In an animal-trap, the trigger-guard E, in combination with the box A, trigger D, catch $j$, pedal C, weight B, guide-rod $b$, and cord $f$, constructed to operate substantially as and for the purpose set forth.

JAMES J. WELLS.

Witnesses:
JOHN S. BASS,
WILLIAM H. BARK.